UNITED STATES PATENT OFFICE.

GEORGE H. BRECHT, OF BURTON, ILLINOIS.

IMPROVEMENT IN MEDICAL COMPOUNDS OR RESTORATIVE BALSAMS.

Specification forming part of Letters Patent No. 120,705, dated November 7, 1871.

*To all whom it may concern:*

Be it known that I, GEORGE H. BRECHT, of Burton, in the county of Adams and State of Illinois, have invented an Improved Medicinal Compound; and the following is declared to be a correct description of the same.

This compound I denominate the "Restorative Balsam," and have employed the same to a considerable extent and demonstrated its beneficial effects in the relief or cure of climatic fevers and fevers arising from affections of the stomach, lungs, liver, kidneys, and of the urinary organs.

This compound is made from vegetable materials and is free from poisonous substances, and hence can be used without fear in cases of weakness arising from illness or otherwise.

In severe cases of sickness the compound may be taken as often as every four hours, and for an adult a teaspoonfull, and the dose should vary with the age; for an infant, six to ten drops will be sufficient. The medicine may be only taken about an hour before meals, or night and morning.

When using this medicine light nourishing substances should be eaten, but acids and fat should be avoided.

The following are the ingredients employed by me: aloe, one ounce; angelica, one ounce; thistle of health, two ounces; orange-peel, one ounce; gentiana, one ounce; vervain, two ounces; pinquefoil, one ounce; ground ivy, one-half ounce; honey, ten ounces; calamus, three-quarters ounce; dandelion, two ounces; myrrh, one ounce; peppermint, one ounce; rhubarb, one ounce; sage, two ounces; centaury, two ounces; milfoil, one-half ounce; fennel-seed, one ounce. These substances are to be introduced into about three quarts of rye whisky and boiled together, and afterward strained and bottled.

I claim as my invention—

The medicinal compound made of the indgredients substantially as specified.

Signed by me this 15th day of September, A. D. 1871.

GEORGE H. BRECHT.

Witnesses:
RICHARD JANSEN,
FRIEDRICH BRECHT. (98)